Figure 1:
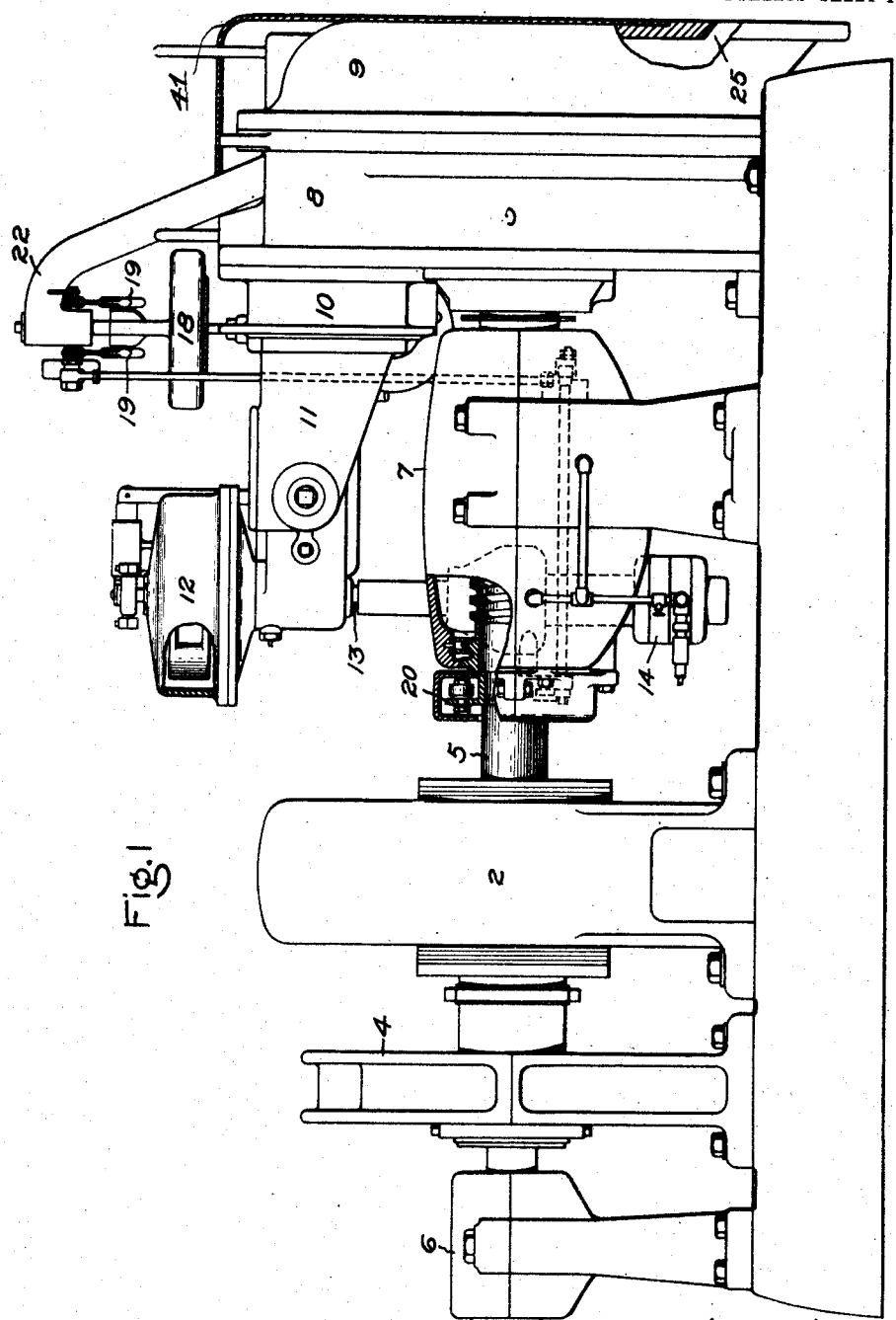

J. G. CALLAN & R. H. RICE.
ELASTIC FLUID TURBINE.
APPLICATION FILED MAY 1, 1907.

905,791.

Patented Dec. 1, 1908.
4 SHEETS—SHEET 1.

Witnesses:
Marcus L. Byng.
J. Ellis Glen

Inventors:
John G. Callan,
Richard H. Rice,
By Albert G. Davis
Atty.

J. G. CALLAN & R. H. RICE.
ELASTIC FLUID TURBINE.
APPLICATION FILED MAY 1, 1907.

905,791.

Patented Dec. 1, 1908.
4 SHEETS—SHEET 2.

Witnesses:
Marcus L. Byng.

Inventors:
John G. Callan,
Richard H. Rice,
By
Att'y.

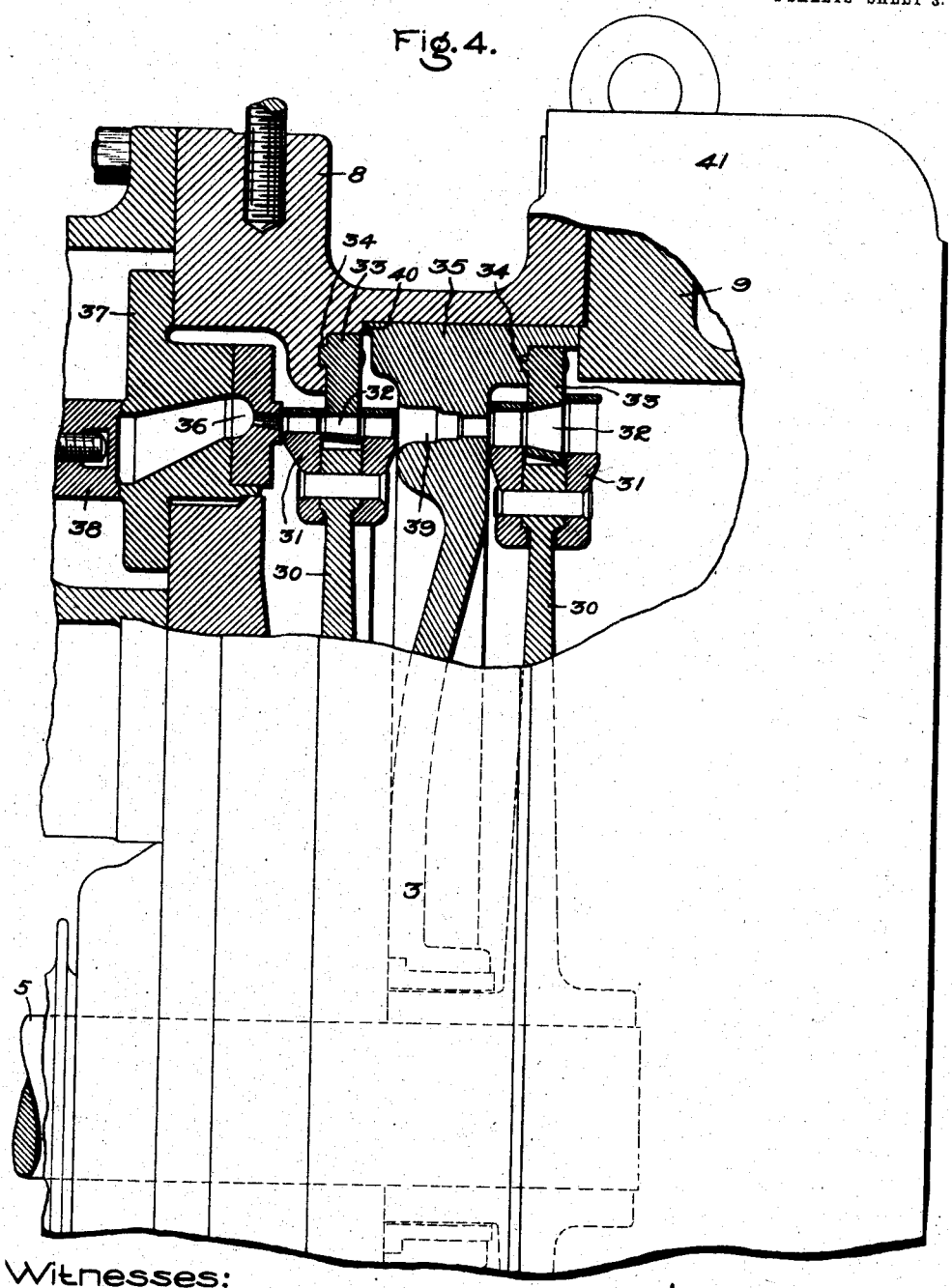

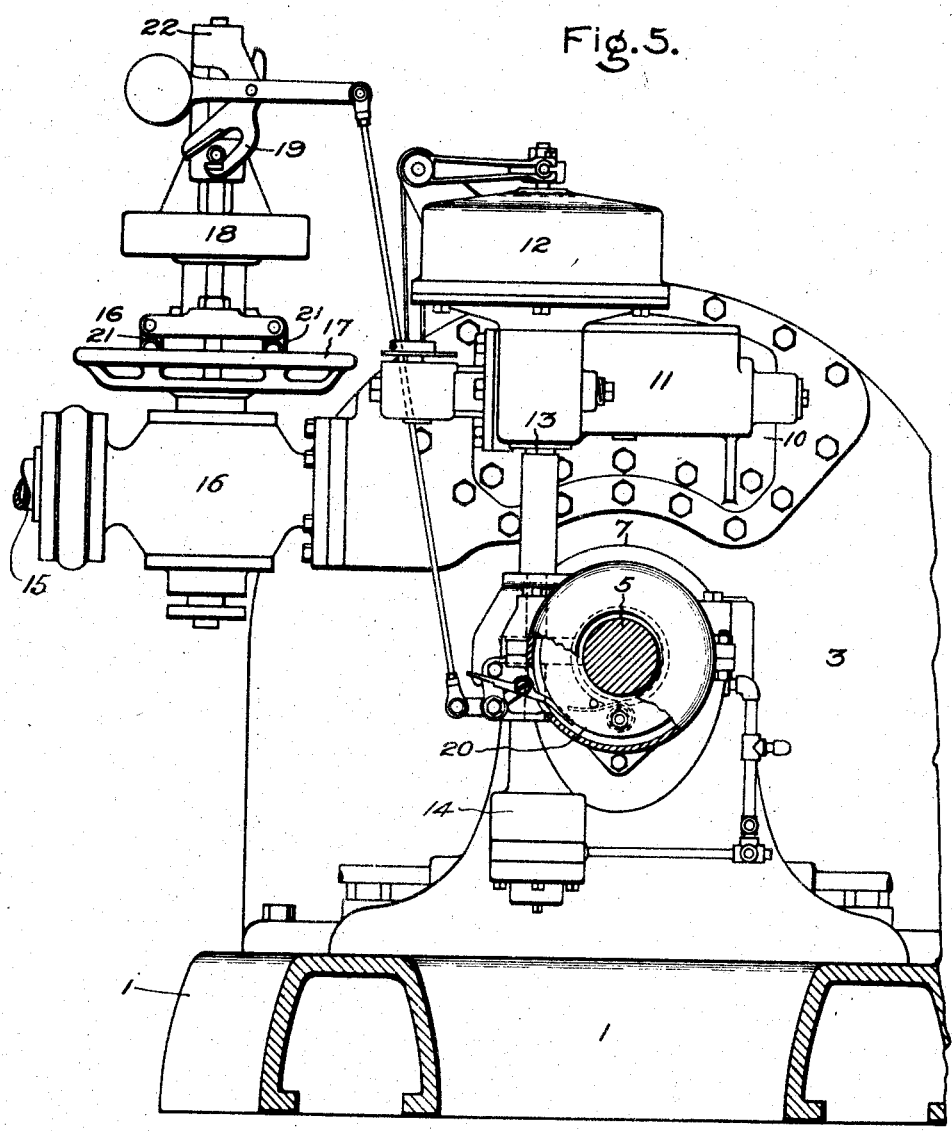

UNITED STATES PATENT OFFICE.

JOHN G. CALLAN, OF NAHANT, AND RICHARD H. RICE, OF LYNN, MASSACHUSETTS, ASSIGNORS TO GENERAL ELECTRIC COMPANY, A CORPORATION OF NEW YORK.

ELASTIC-FLUID TURBINE.

No. 905,791.   Specification of Letters Patent.   Patented Dec. 1, 1908.

Application filed May 1, 1907. Serial No. 371,255.

*To all whom it may concern:*

Be it known that we, JOHN G. CALLAN, a citizen of the United States, residing at Nahant, county of Essex, State of Massachusetts, and RICHARD H. RICE, a citizen of the United States, residing at Lynn, county of Essex, State of Massachusetts, have invented certain new and useful Improvements in Elastic-Fluid Turbines, of which the following is a specification.

The present invention relates to elastic-fluid turbines having horizontal shafts, and has for its object to improve their construction.

The invention has particular utility in connection with turbo-generators, and will therefore be described in reference thereto.

In carrying out the invention the field-frame of the generator and the casing for the turbine are mounted upon a bed-plate common thereto. The support for the brush-holders for the generator may also be mounted thereon. The revolving element of the generator and the wheel buckets for the turbine are mounted on the same shaft, thereby dispensing with couplings. The shaft is supported by two pillow-blocks, a small one located beyond the end of the generator farthest from the turbine and the main one between the generator and the turbine. In other words, the bucket wheel structure is overhung with respect to the main pillow-block, and by its weight tends to relieve the pressure on the lining of the pillow-blocks at the left of the generator. By using two pillow-blocks only and arranging them as described, the lubricating system is much simplified, since it is unnecessary to use forced lubrication in the left-hand one. It also reduces the amount and the cost of piping. Furthermore, it prevents the objectionable flow of lubricant from one bearing to another when the machine is mounted on a ship and the latter pitches or rolls. Since there is no piping for the lubricating system in front of the turbine, it follows that the latter can be taken down and reassembled without breaking any of the connections in said system.

The turbine is divided into stages and the wheels therefor are overhung and are therefore accessible from the end of the bed-plate. The casing of the turbine is divided in planes perpendicular to the axis so that the sections together with the wheels and diaphragms can be removed from the end. By taking these parts off at the end the exhaust connection may be so arranged that it is left unbroken,— a very desirable arrangement, or, in other cases, a small portion only of the connection is removed in order to get at the parts of the machine.

The governing mechanism, instead of projecting beyond the machine proper and therefore increasing the total over-all dimensions, is located on the pillow-block side of the turbine and overhangs it. This results in a short machine, since the governing mechanism adds nothing to the over-all length. It also obviates the necessity of removing the valve gear and governor, and breaking the steam connection when it is desired to examine or remove the wheels, and it affords an opportunity for easily driving the valve gear from a well housed and lubricated gearing in the main pillow-block. Accessibility, freedom from liability to injury and simplicity of governing and lubricating connections are also well served by this general arrangement. We also locate the shut-off or emergency valve mechanism between the generator and the turbine because this position offers for this valve advantages similar to those which it affords for the main valve gear. The main governor may be mounted upon the intermediate shaft transmitting power from the main shaft to the valve gear, but the emergency governor should be mounted directly upon the main shaft, so that no accident to gearing or like connections can interfere with its action.

The lining for the main pillow-blocks is made long and substantial so as to afford ample bearing surface for the shaft. The pillow-block also contains the worm gearing for driving the governor shaft, and the governor shaft is extended through the pillow-block. It will thus be seen that the governor, its shaft, the worm gearing, pillow-block and the lubricating pump need not be disturbed in taking down the turbine casing to get at the wheels. Further, the cap for the pillow-block can be removed to get at the lining without disturbing the governing mechanism. These features are all of importance in that they tend to simplify the construction, reduce the errors due to poor workmanship, preserve the alinement and decrease the cost of construction and reduce floor space.

Figure 2:
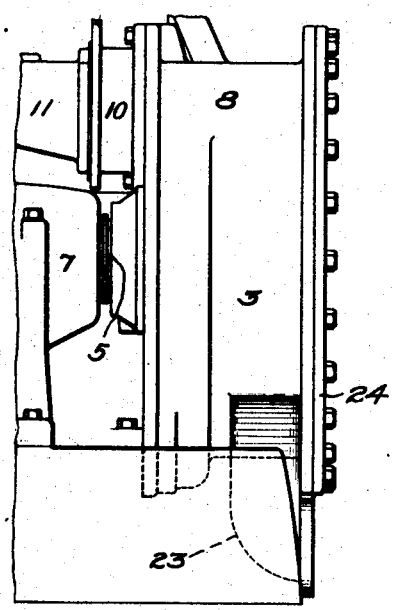
Figure 3:
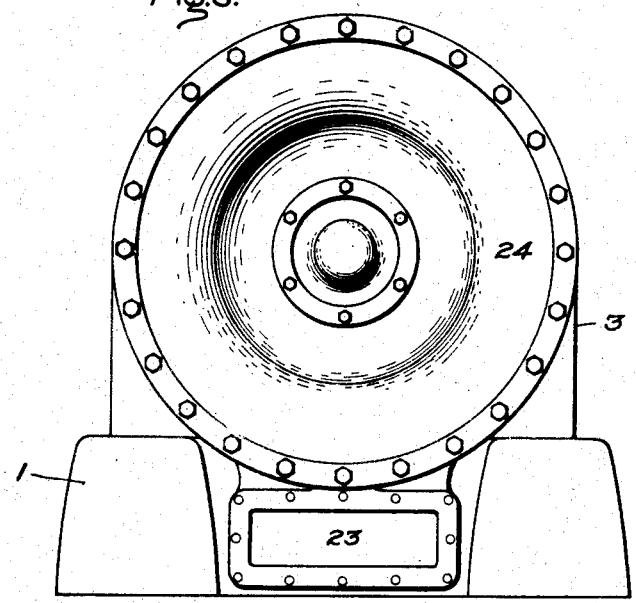

In the accompanying drawings, which illustrate certain of the embodiments of our invention, Figure 1 is a view in side elevation of a turbo-generator constructed in accordance with our invention; Fig. 2 is a detail view of a slight modification showing the exhaust conduit terminating below the main casing; Fig. 3 is an end view of the same; Fig. 4 is an enlarged view, partially in section, of the turbine; and Fig. 5 is a view showing the emergency valve mechanism in side elevation.

1 indicates the bed-plate of the machine, upon which is mounted an electric generator 2, a turbine casing 3 and a support 4 for the brush holders of the electric generator. The rotating member of the generator and the turbine are mounted on the shaft 5 which is supported by pillow-blocks 6 and 7, the bucket wheels for the turbine being overhung with respect to the pillow-block 7. These pillow-blocks are also mounted upon the bed-plate 1. The turbine casing comprises two principal parts 8 and 9, the line of division being perpendicular to the shaft. Attached to the portion 8 of the casing is a steam chest 10, the bracket 11 forming a cover therefor and inclosing and supporting the admission valves and their actuating mechanism. These valves are under the control of a speed governor the weights of which are inclosed by the casing 12. The speed governor is driven by the secondary shaft 13 driven by worm gearing, on the main shaft 5. On the lower end of the secondary shaft 13, and driven thereby, is a pump 14 for supplying lubricant under pressure to the bearing surfaces in the main pillow-block. The lining of the pillow-block 6 is supplied with lubricant by oiling rings or other devices in the ordinary way, it being unnecessary to provide forced circulation on account of the fact that the weight of the moving element of the turbine counterbalances to a greater or less extent the weight thereon.

Located at one side of the steam chest and supplying steam thereto is a conduit 15 attached to a combined emergency and throttle valve 16, shown in Fig. 5. This valve is provided with a hand wheel 17 for hand regulation, and a weight 18 for closing it under emergency conditions. The weight is normally sustained in the position shown by the latch 19 under the control of the emergency governor 20 mounted on the main shaft and inclosed in a casing. When the emergency governor operates it withdraws the latches 19 and permits the weight to fall and collapse the two toggles 21 and close the valve suddenly. The upper end of the emergency valve spindle is located in an arm 22 carried by the portion 8 of the turbine casing. This arm also carries the latches which normally support the weight 18.

In Fig. 2 the turbine casing is shown as provided with a downwardly extending conduit 23 the discharge end of which occupies a plane perpendicular to the axis and below the removable head 24 of the turbine. It will thus be seen that by removing the head access may be had to the wheels and the diaphragms in the casing without breaking the exhaust connection or in any manner disturbing the other parts.

In the construction shown in Fig. 1 the portion 9 of the casing is provided with a discharge opening 25, which means that the elbow connecting it with the main exhaust conduit will have to be removed before access can be had to the wheels and inside mechanism of the turbine.

In Fig. 4 certain of the details of construction of the turbine are illustrated. 30 indicates the wheels mounted on the main shaft 5, and provided with rows of buckets 31 with more or less complete rows of intermediate buckets 32 between for directing the steam from one row of wheel buckets to the next. The intermediate buckets are carried by supports 33 each of which is provided with a projection 34 that is seated in a groove in the support and in addition to securing the same in place assist in centering them with respect to the axis of the machine. The supports are secured in place by screws or other suitable means. The intermediates for the second stage are secured to the diaphragm 35 while those of the first stage are carried by the section 8 of the wheel casing. Two rows of wheel buckets per stage have been illustrated, which arrangement is more particularly intended for non-condensing service. For condensing service other things being equal it will be preferable to use three rows of wheel buckets per stage. In the former case the velocity of the motive fluid will be extracted by two operations in each stage, and in the latter by three. Steam is admitted to the first wheel by the nozzle 36, which may be of the expansion or non-expansion type. This nozzle is carried by a support 37 bolted or otherwise secured to the casing section 8. The admission of steam is controlled by separately actuated valves 38, one of which is shown. Between one stage and the next is a stage nozzle 39, which may be expanding or non-expanding in character, as desired.

It is to be noted that the walls of the nozzle at the entrance are well rounded or curved so that the steam discharged from the first stage wheel will, as it flows therethrough, have an ejector action and therefore decrease the amount of steam in the wheel compartment. The fluid issuing from the last wheel of the first stage should pass as directly as possible into the second stage nozzle so as to conserve the residual velocity of the motive fluid. The diaphragm 35 is held in place by the end portion 9 of the wheel casing, a shoulder thereon engaging the peripheral portion of the diaphragm and forcing it up against a shoulder 40 formed on the portion 8 on the wheel casing. The casing as a whole is lagged and inclosed by a sheet-metal covering 41.

We have shown our invention in connection with an impact machine of the Curtis type, but it is also applicable to machines of the reaction type and to machines embodying the impact and reaction principle. It is also applicable to machines of the radial flow type.

The admission of steam to the turbine is controlled by a plurality of separately actuated valves, which have an open and closed position but no intermediate, but if desired we may employ a governing mechanism of the throttling type and throttle the admission of steam to the turbine in accordance with the demand for steam. We may accomplish this by one large valve or a number of small valves as desired. It is evident by locating the governing mechanism inboard and overhanging the pillow-block that considerable space is saved. This also enables us to locate the secondary shaft in the pillow-block and gear directly with the minimum chance of having poor alinement. Further, the gearing and shaft will be well lubricated by the oil in the pillow-block. This also results in a symmetrical and advantageous arrangement of the exhaust conduit.

In accordance with the provisions of the patent statutes, we have described the principle of operation of our invention, together with the apparatus which we now consider to represent the best embodiment thereof; but we desire to have it understood that the apparatus shown is only illustrative, and that the invention can be carried out by other means.

What we claim as new and desire to secure by Letters Patent of the United States, is,—

1. In an elastic fluid turbine, the combination of a bed-plate, a pillow-block mounted thereon, a shaft supported thereby, an overhung revolving bucket element mounted on the shaft, a casing for the wheel also mounted on the bed-plate, and a governing mechanism for the turbine which is located on the pillow-block side of the machine.

2. In an elastic fluid turbine, the combination of a bed-plate, a pillow-block mounted thereon, a shaft supported thereby, an overhung revolving bucket element mounted on the shaft, a casing for the wheel also mounted on the bed-plate, a governing mechanism for the turbine located on the pillow-block side of the casing and a secondary shaft for actuating the governing mechanism which is located in the pillow-block.

3. In an elastic fluid turbine, the combination of a bed-plate, a pillow-block mounted thereon, a shaft supported thereby, an overhung revolving bucket element mounted on the shaft, a casing for the wheel also mounted on the bed-plate, a speed governor, a secondary shaft for driving it, gearing between the main and secondary shafts located in the pillow-block, and a valve mechanism supported by the wheel casing and located on the pillow-block side thereof.

4. In combination, a bed-plate, a turbine and an apparatus driven thereby mounted on the bed-plate, a pillow block between the driven apparatus and turbine, a shaft mounted therein which carries the rotating member of the said apparatus on one side of the pillow-block and that of the turbine on the other, and a governing mechanism supported by the turbine which is located on the pillow-block side of the turbine.

5. In combination, a bed-plate, a driven apparatus and a turbine mounted thereon, a pillow-block between the driven apparatus and turbine, a shaft mounted therein which carries the rotating member of the said apparatus on one side of the pillow-block and that of the turbine on the other, a governing mechanism supported by the turbine which extends over the pillow-block, a secondary shaft located in the pillow-block for driving the governing mechanism, and a lubricating pump also driven by the secondary shaft.

6. In a turbine, the combination of a horizontal shaft, a pillow-block therefor, a bucket element mounted on the shaft and overhung with respect to the pillow-block, a casing for the bucket element having a removable head on the low pressure side, and an exhaust conduit which connects with the casing at a point below the head so that the head can be removed to expose the bucket element without disturbing the conduit.

7. In a turbine, the combination of a horizontal shaft, a pillow-block therefor, a bucket element mounted on the shaft and overhung with respect to the pillow-block, a casing for the bucket element, an exhaust conduit that is attached to the casing on the side opposite the pillow-block, and a governing mechanism attached to the opposite side of the casing which overhangs the pillow-block.

8. In a turbine, the combination of a horizontal shaft, a pillow-block therefor, a bucket element mounted on the shaft and overhung with respect to the pillow-block, a casing for the element, a secondary shaft for driving the governing mechanism mounted in the pillow-block, gearing between the shafts also located in the pillow-block, and a governing mechanism actuated by the secondary shafts.

9. In a turbine, the combination of a shouldered casing, a diaphragm for dividing it into compartments, an end head for the casing which also forces the diaphragm against a shoulder in the casing, wheel buckets in the compartments, and stage nozzles which receive fluid exhausting from one set of buckets and discharge it against another, the receiving end of said nozzles being well rounded and located close to the discharging buckets so that the motive fluid in its passage will create an ejector action and reduce the amount of motive fluid in a compartment.

In witness whereof, we have hereunto set our hands this twenty-third day of April, 1907.

JOHN G. CALLAN.
RICHARD H. RICE.

Witnesses:
    JOHN A. McMANUS, Jr.,
    PHILIP F. HARRINGTON.